United States Patent [19]
Plett

[11] 3,886,790
[45] June 3, 1975

[54] APPARATUS FOR DETERMINING THE GROSS THRUST OF A JET ENGINE

[75] Inventor: Edelbert G. Plett, Belle-Mead, N.J.

[73] Assignee: Control Data Canada, Ltd., Willowdale, Ontario, Canada

[22] Filed: Mar. 18, 1974

[21] Appl. No.: 452,278

[30] Foreign Application Priority Data
Apr. 27, 1973 Canada .................................. 169738

[52] U.S. Cl. .............................................. 73/117.4
[51] Int. Cl. ........................................ G01m 15/00
[58] Field of Search................ 73/117.4, 116, 117.3; 235/150.2, 150.22

[56] References Cited
UNITED STATES PATENTS
| | | | |
|---|---|---|---|
| 3,233,451 | 2/1966 | Russ................................... | 73/117.4 |
| 3,258,958 | 7/1966 | Bosch et al. ....................... | 73/117.4 |

*Primary Examiner*—Jerry W. Myracle
*Attorney, Agent, or Firm*—Roylance, Abrams, Berdo & Kaul

[57] ABSTRACT

Apparatus is known for determining the total pressure in the nozzle of an afterburning jet engine without using an immersed probe downstream of the afterburner. This known apparatus uses tailpipe pressures as the only variables used to determine nozzle total pressure, however it is based on an engine having a cylindrical afterburner tailpipe, having no cooling air introduced upstream of the nozzle entrance, and it neglects frictional factors in the working fluid. The present invention takes into account in the determination of nozzle total pressure, the following factors: the tailpipe liner need not be cylindrical, cooling air may be added, and frictional effects are considered. The apparatus determines nozzle total pressure in an afterburning engine whether or not the afterburner is operating and without requiring an input to show whether or not the afterburner is operating. A further embodiment determines the engine gross thrust using nozzle total pressure as one parameter in the determination.

3 Claims, 2 Drawing Figures

PATENTED JUN 3 1975 3,886,790

APPARATUS FOR DETERMINING THE GROSS THRUST OF A JET ENGINE

The invention herein described was developed using funds of the United States and Canadian governments.

This invention relates to the determination of the nozzle total pressure in a jet engine and to a thrustmeter for determining the aerodynamic gross thrust of a jet engine using as one parameter the nozzle total pressure.

The aerodynamic gross thrust of a jet engine is conventionally defined as the momentum of the nozzle exhaust gases plus any pressure force which exists due to complete expansion of the exhaust gases. This relationship, written in equation form, is:

$$F_G = \frac{\dot{m} V_e}{g_o} + A_e (P_{se} - P_{so})$$

wherein:

$F_G$ = aerodynamic gross thrust
$\dot{m}$ = mass flow rate through the nozzle
$V_e$ = velocity of exhaust gases
$g_o$ = dimensional constant
$A_e$ = exit area of nozzle
$P_{se}$ = static pressure existing at the plane of the nozzle exit
and
$P_{so}$ = ambient static pressure The previous teachings have developed various functional forms of this fundamental definition equation. It is well known from these works that a knowledge of the ambient static pressure and internal pressures in the exhaust region of the jet engine, in addition to a nozzle area, can enable a determination of the gross thrust.

For variable nozzle exit area engines there are three variables involved in the computation of gross thrust. These variables are the nozzle total pressure $P_{TN}$, the ambient static pressure $P_{so}$, and the nozzle exit area $A_e$.

The difficulties associated with the inflight measurement of the nozzle exit area are overcome in the teachings by trading the $A_e$ measurement for a measurement of the nozzle entrance static pressure $P_{SN}$. For this case, the gross thrust can be computed using the simple equation which follows:

$$F_G = A_N \cdot P_{so} \cdot f_1 (P_{TN}, P_{SN}) \cdot f_2 (P_{TN}, P_{so})$$

wherein:

$F_G$ = gross thrust
$P_{so}$ = ambient static pressure
$A_N$ = area of nozzle entrance
$P_{TN}$ = nozzle entrance total pressure
$P_{SN}$ = nozzle entrance static pressure
$f_1$ = function of nozzle entrance static and total pressures,
and
$f_2$ = function of nozzle entrance static pressure and ambient static pressure.

It will be noted from the above equation that the gross thrust can be calculated from a knowledge of three variables, namely, the nozzle total pressure $P_{TN}$, the ambient static pressure $P_{so}$, and the nozzle entrance static pressure $P_{SN}$. In this approach the nozzle entrance area $A_N$ is a constant.

It will be recognized that a knowledge of the nozzle total pressure is a requirement in both types of fundamental jet engine gross thrust determination procedures, namely the system which uses the variable exhaust exit area and the system employing the nozzle entrance static pressure measurement.

A major disadvantage of current gross thrustmeters relates to the measurement or prediction technique which enables a calculation of gross thrust for an engine which operates in the afterburning mode. The current systems require a knowledge of the nozzle total pressure $P_{TN}$. The measurement/prediction technique used hitherto fall into three main categories:

1. Measurement of the nozzle total pressure using an immersed probe: With the afterburner in operation, special total pressure probes are required because of the extremely hot gases that exist at the measurement station. Attempts have been made to cool the immersed probe by intermittent immersion or continuous cooling, but these have not been successful in an airborne system. An immersed probe will fail in a very short time when the afterburner is operating.

2. Measurement of the nozzle total pressure using a cooled immersed probe situation at the nozzle entrance (or exit).

This measurement is used to construct a correlation between engine tailpipe pressure measurements and the nozzle total pressure. The disadvantage of this approach is clearly the need to know when the afterburner is operating or when it is not since two calibration curves are possible. One calibration is appropriate to non-afterburner engine operation and the other is unique to afterburning operations.

3. Prediction of the nozzle total pressure using measured tailpipe static pressures and a total pressure measured upstream of the afterburner flameholders. There are three factors which affect the accuracy using this approach. These factors are: (a) the assumption that the nozzle total pressure is independent of any cooling air added through the tailpipe liner, (b) no consideration is given to tailpipe geometries which are noncylindrical, and (c) no consideration is given to frictional effects in the working fluid.

It is therefore an object of the invention to provide apparatus for determining the nozzle total pressure with greater accuracy by taking into consideration frictional factors and tailpipe geometry factors.

It is an object of this invention to provide apparatus for determining nozzle total pressure without the use of immersed pressure probes downstream of the afterburner flameholder of the jet engine.

Another object of this invention is to provide a gross thrustmeter which can operate to calculate the gross thrust of afterburning jet engines without being dependent upon a knowledge of when the engine is operating in the afterburning mode or when it is not.

A further object is to provide a gross thrustmeter which can predict the gross thrust of afterburning jet engines which employ non-frictionless fluids, cooling air addition and non-cylindrical afterburner liners.

Briefly, the present invention in its broadest aspect is for apparatus for determining the total pressure at the nozzle entrance of a jet engine without restricting the nozzle total pressure determination procedure to ideal flow in cylindrical tailpipe liners. The apparatus comprises a pressure responsive means for detecting the total pressure upstream of the afterburner flameholders and providing a first signal representative of said total pressure $P_{T5}$, pressure responsive means for detecting the static pressure at the nozzle entrance and providing a second signal representative of said static pressure $P_{SN}$, pressure responsive means for detecting the static pressure at a location in the engine positioned between the total pressure measurement station and the nozzle entrance static pressure measurement station and providing a third signal representative of said static pressure $P_{S6}$, and computer means for combining the first, second and third signals in a predetermined manner to provide a fourth signal representing total pressure at the nozzle entrance $P_{TN}$.

An embodiment of the invention is for apparatus for determining gross thrust in a jet type engine including apparatus which determines the total pressure at the nozzle entrance, and further comprises means for combining signals representing the total pressure at the nozzle entrance, ambient static pressure and predetermined constants and evaluating a predetermined relationship to obtain an indication of gross thrust.

The invention will be described hereinafter in greater detail with reference to the accompanying drawings, in which.

Figure 1:
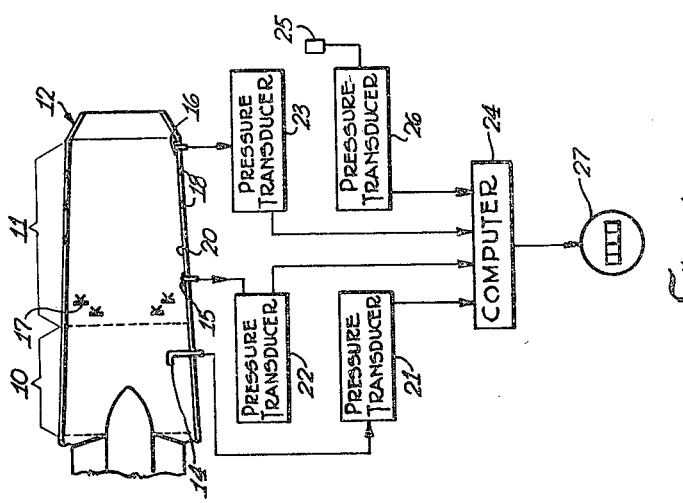
FIG. 1 is a schematic diagram of the components of the invention.

Referring to FIG. 1 there is shown the after or rear part of an afterburning jet engine in schematic form. The part shown comprises a diffuser 10, a tailpipe (or afterburner region) 11 and a nozzle 12. The afterburner rings or gutters are shown at 17. The "tailpipe liner" may have slots 18 for admission of cooling air to the tailpipe combustion region from a surrounding passageway. Three pressures are obtained from the engine. A total pressure probe 14 is positioned in the diffuser 10 and it is responsive to a total pressure $P_{T5}$. A tap 15 in the liner 20 of the flameholder area is responsive to static pressure $P_{S6}$. A tap 16 positioned in the liner 20 in the nozzle entry area is responsive to static pressure $P_{SN}$. Three pressure transducers 21, 22 and 23 are responsive to the pressures $P_{T5}$, $P_{S6}$ and $P_{SN}$ respectively. The pressure transducers 21, 22 and 23 provide signals proportional to $P_{T5}$, $P_{S6}$ and $P_{SN}$ and these signals are applied to a computer 24. These three variable inputs are all that are required to determine nozzle total pressure $P_{TN}$. The computer 24 can provide an output indicative of $P_{TN}$.

In the apparatus according to the invention it is not necessary to use a total pressure probe which is immersed in the gas stream downstream of the afterburner flameholders. The determination of nozzle total pressure is not based on theory which considers engines with ideal flows in cylindrical tailpipes. Thus, the jet engine with complex tailpipe flows and geometry can operate in the afterburning mode or not without affecting the determination of nozzle total pressure and of gross thrust. Total pressures are sensed using conventional total pressure probes installed in the "low temperature" environment of the engine, i.e., upstream of the flameholder. Static pressures are available using static wall taps located in the engine tailpipe downstream of the flameholder. These pressures are used to determine the total pressure at the nozzle entrance.

For a gross thrust determination a signal representing the altitude ambient static pressure is already available in the aircraft's flight instrumentation system. Thus, all the signals are readily available and serve as inputs to a computer which solves an equation to determine gross thrust.

$$F_G = A_N \cdot P_{so} \cdot f_1 (P_{TN}, P_{SN}) \cdot f_2 (P_{TN}, P_{so})$$

Thus, the present invention involves implementation of a novel general theoretical relationship, which is applicable to complex engine tailpipe geometries and acknowledge the behaviour of the real flow processes occurring in the tailpipe, to determine the nozzle total pressure without actually measuring it. An embodiment of the invention uses the nozzle total pressure to determine engine gross thrust.

The derivation of the general theoretical relationship to determine $P_{TN}$ from measurements of $P_{T5}$ and $P_{SN}$ is based on one dimensional flow of a fluid in a duct.

The derivation proceeds by the following steps: I. Determination of the flameholder region total pressure $P_{T6}$ using measurements of the diffuser total pressure $P_{T5}$ and the flameholder region static pressure $P_{S6}$.

$P_{T6}$ is related to $P_{T5}$ by a diffuser-plus-flameholder loss factor:

$$P_{T6} = g_1 (P_{T5}, P_{S6}, K_1)$$

wherein $K_1$ is a constant. II. Determination of the nozzle entrance total pressure $P_{TN}$ using measurements of the flameholder region static pressure $P_{S6}$, nozzle entrance static pressure $P_{SN}$, and the aforementioned value determined for the flameholder region total pressure $P_{T6}$.

The processes which occur between the flameholder region measurement station and the nozzle entrance measurement plane can be described mathematically by selecting a one-dimensional flow model and applying the conservation equations, (energy, mass and momentum) to this model. III. Determination of the nozzle entrance total pressure $P_{TN}$ using measurements of the flameholder region static pressure $P_{S6}$, nozzle entrance static pressure $P_{SN}$, and the aforementioned value determined for the flameholder region total pressure $P_{T5}$.

The processes which occur between the flameholder region measurement station and the nozzle entrance measurement plane can be described mathematically by selecting a one-dimensional flow model and applying the conservation equations, (energy, mass and momentum) to this model.

The absolute temperature rise due to afterburning is related to the static pressure drop across the tailpipe:

$$\frac{\Delta T_o}{\overline{T_o}} = g_2 [\overline{\gamma}, C_1, C_2, P_{T6}, P_{S6}, P_{SN}, P_{TN}] \quad (3)$$

wherein:
$\Delta T_o$ = total temperature increase between axial stations 6 and N,
$\overline{T_o}$ = mean total temperature between stations 6 and N,
$\overline{\gamma}$ = mean ratio of exhaust gas specific heat between stations 6 and N,
$C_1, C_2$ = constants related to tailpipe geometry and fluid flow
$P_{T6}$ = flameholder region total pressure (at station 6),
$P_{S6}$ = flameholder region static pressure (at station 6),
$P_{SN}$ = nozzle entrance static pressure (at station N), and
$P_{TN}$ = nozzle entrance total pressure (at station N).

The total pressure drop across the afterburner is related to the absolute temperature rise because of afterburning:

$$\frac{\Delta P_T}{\bar{P}_T} = g_3 [\Delta T_a, \Delta\gamma, \bar{\gamma}, C_2, P_{T6}, P_{S6}, P_{TN}, P_{SN}] \quad (4)$$

wherein:

$\Delta P_T$ = total pressure decrease between axial station 6 and N, $\bar{P}_T$ = mean total pressure between stations 6 and N, $\Delta\gamma$ difference between exhaust gas ratio of specific heat between station 6 and N, and $C_2$ = constant related to tailpipe fluid flow. Elimination of $\Delta T_a$ in equation (2) using equation (1) provide $$\frac{\Delta P_T}{\bar{P}_T} = g_4[C_1, C_2, \Delta\gamma, \bar{\gamma}, P_{T6}, P_{S6}, P_{TN}, P_{SN}] \quad (5)$$

Since $\Delta P_T = P_{TN} - P_{T6}$ and $\bar{P}_T = \dfrac{P_{TN} + P_{T6}}{2}$, Equation (5), in its simplest functional form reduces to:

$$P_{TN} = \eta (P_{TN}, P_{T5}, P_{S6}, P_{SN}, C_1, C_2, K_1, \gamma) \text{ TM} \quad (6)$$

since $$P_{T6} = g_1 (P_{T5}, P_{S6}, K_1). \quad (7)$$

Equation (6) can be solved in a repetitive manner to iteratively ascertain the desired nozzle total pressure $P_{TN}$.

The constants $K_1$, $C_1$ and $C_2$ are available from a static ground-level engine run, and for an afterburning engine operating without a light-off detector present. The constant $\Delta\gamma$ is assumed to be zero when $\Delta\alpha$ is selected as the average ratio of specific heats. When it is possible to detect operation in the after-burning mode, $\Delta\gamma$ and $\bar{\gamma}$ are selected with $\Delta\alpha > 0$. Therefore equation (6), unmodified, can be employed to calculate the desired nozzle total pressure $P_{TN}$. Thus, the equation is useful in determining $P_{TN}$ in both afterburning and non-afterburning modes of engine operation.

It will be obvious to someone with ordinary aerothermodynamic skill in the propulsion turbomachinery discipline that the method of enabling the obtaining of an indication of nozzle total pressure $P_{TN}$ does not depend upon any preferred location of the pressure probes (and taps). Consider, for example, a simple afterburning turbojet (compressor, combustion burner, turbine, diffuser, tailpipe and nozzle) engine. The conventional total pressure probe may be located anywhere in the diffuser section, i.e., downstream of the final turbine stage up to the tailpipe flameholder. The nozzle static pressure tap which indicates $P_{SN}$ must be located downstream of the flameholder. The static pressure $P_{S6}$ (defined as the flameholder static pressure) may be measured using a wall tap located downstream of the flameholder but upstream of the wall tap which measures $P_{SN}$. Either a wall tap or an immersed static pressure probe situated downstream of the final turbine stage, but upstream of the flameholder, will also provide the necessary indication representing $P_{S6}$.

A functional form of a gross thrust determination equation (1), was referred to earlier:

$$F_G = A_N . P_{so} . f_1 (P_{TN}, P_{SN}) \cdot f_2 (P_{TN}, P_{so}) \quad (1)$$

The function $f_2 (P_{TN}, P_{so})$, which describes the operation of the engine exhaust nozzle, is different for different types of nozzles (convergent only, convergent-divergent).

The aerodynamic gross thrust of a convergent nozzle may be computed using either a complete expansion gross thrust equation or an incomplete expansion gross thrust equation. The aerodynamic gross thrust of a convergent-divergent nozzle may be computed using a complete expansion gross thrust equation for the nozzle is ideally capable of accomplishing the desired expansion to the ambient static pressure.

The gross thrust arising from a complete expansion nozzle is:

$$F_G = A_N . P_{so} . f_1 (P_{TN}, P_{SN}) \cdot f_c (P_{TN}/P_{so}) \quad (8)$$

and the gross thrust using an incomplete expansion (choked convergent nozzle) is:

$$F_G + A_N . P_{so} . f_1 (P_{TN}, P_{SN}) \cdot f_I (P_{TN}/P_{so}) \quad (9)$$

wherein:

$f_I$ = nozzle expansion function for a complete expansion nozzle, and $f_c$ = nozzle expansion function for an incomplete expansion nozzle.

The value of the engine nozzle pressure ratio $P_{TN}/P_{so}$ dictates which equation is employed to compute the gross thrust.

If $P_{TN}/P_{so} = (\gamma+1/2)^{\gamma/\gamma-1}$ either the complete or incomplete expansion equations may be used. The complete expansion equation is necessarily employed whenever $P_{TN}/P_{so}$ becomes less then $(\gamma+1/2)^{\gamma/\gamma-1}$. On the other hand, a choked convergent nozzle operation (i.e., incomplete expansion) is detected by values of $P_{TN}/P_{so}$ which are greater than $(\gamma+1/2)^{\gamma/\gamma-1}$ and use is therefore made of the incomplete expansion equation.

Figure 2:
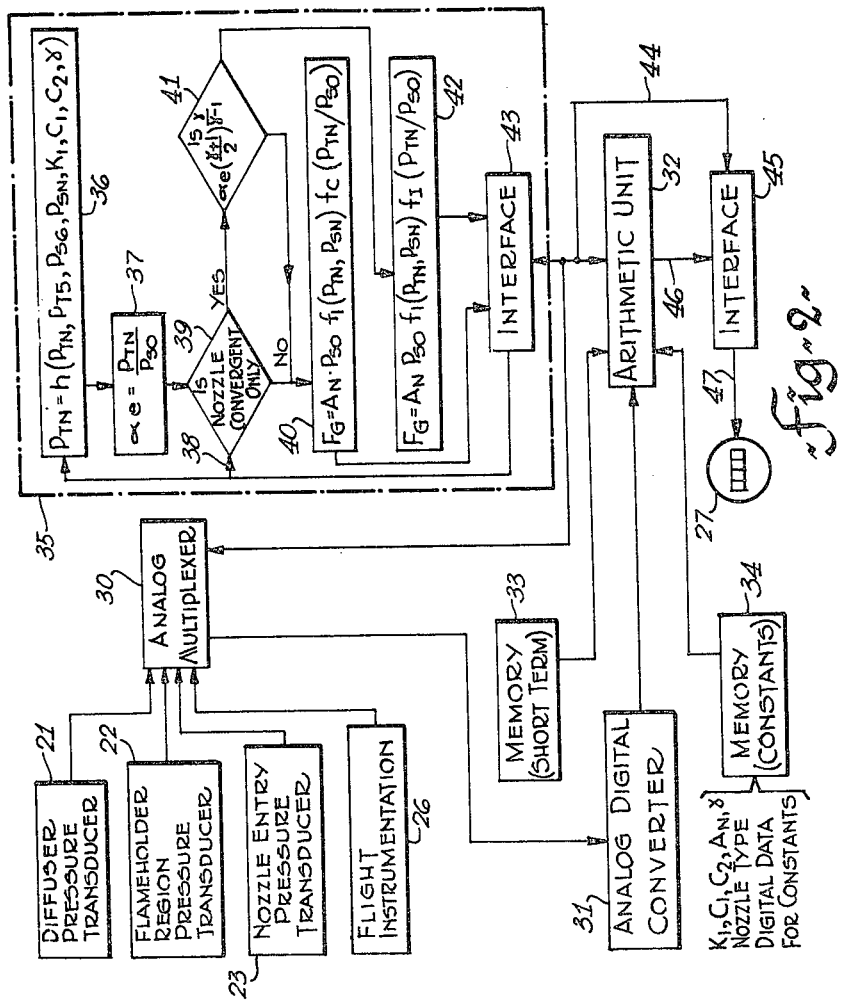
FIG. 2 is a block diagram drawing a gross thrust system.

Referring now to FIG. 2, there is shown in block form an example of circuitry suitable for a gross thrust meter according to this invention. Signals are provided from pressure transducers 21, 22, 23, and 26 and these signals represent, respectively, total pressure $P_{T5}$ from the diffuser, static pressure $P_{S6}$ from the flameholder area, static pressure $P_{SN}$ from the nozzle entry region, and ambient static pressure $P_{so}$. These signals are applied to a multiplexer 30 which provides as its output a series of signals variable in accordance with the signals applied to it. These signals are applied to an analog to digital converter 31 which converts the signals to digital form. The digital data is applied to an arithmetic unit 32. Associated with arithmetic unit 32 are three memory units. A short term memory 33 or "scratch pad memory," a constant memory 34 and a main program memory 35. The short term memory 33 scales the input data and stores it temporarily for use by the arithmetic unit 32 and as required by the program memory 35. The constants memory 34 receives, in digital form, signals representing constants involved in equations 6 and 7 and also a representation that the nozzle is nonconvergent (i.e., convergent-divergent) or is convergent only.

It will be recalled that there must be a determination of $P_{TN}$ or total pressure at the nozzle. The necessary values are present in memories 33 and 34 to solve equation 6. It is believed this is well within the ordinary skill of a workman in the computer arts. The block indicated as 36 in the program memory 35 solves equation 6 iteratively for $P_{TN}$. If desired the signal representing $P_{TN}$ can be applied to an indicator, and can be put to any other use. When determining gross thrust the signal for $P_{TN}$ is applied to circuitry represented by block 37 which provides a signal representing $P_{TN}/P_{so}$.

As was previously explained it is necessary to ascertain (a) if the nozzle is convergent or convergent-divergent, and, depending on this, (b) if there is complete or incomplete expansion of exhaust gases. The decision circuitry 39 for achieving this receives over 38 a signal (originating in the constants memory 34 that the nozzle is or is not convergent. If the nozzle is not convergent (i.e., if it is convergent-divergent) the complete expansion equation (equation 8) is selected as is indicated by block 40. If the nozzle is convergent a signal representing $\alpha_e$ is applied to decision circuitry represented by block 41 which determines whether there is complete or incomplete expansion. When $\alpha_e > (\gamma+1/2)^{\gamma/\gamma-1}$ the expansion is considered as complete and equation 8 is selected as in block 40, otherwise the incomplete expansion equation (equation 9) is used as indicated by block 42.

The appropriate equation is available via an interface 43 and is solved by arithmetic unit 32 for gross thrust. The signal representing gross thrust is applied over conductor 44 to an indicator interface 45 which also receives a control signal on conductor 46. The indicator drive signal is applied to indicating instrument 27 over conductor 47.

It is believed that the computer circuitry for solving the equations set forth is within the ordinary skill of a computer technician and that no further description is required.

It will be apparent that the invention described provides apparatus for determining $P_{TN}$ and an improved thrustmeter of novel design which avoids the use of immersed probes and which can accomodate different nozzles and different operational modes with minimal calibration.

The embodiments of the invention in which an exclusive property or privilege is claimed are defined as follows:

1. Apparatus for use in a jet type engine having a diffuser, a tailpipe, and a nozzle, for determining the total pressure at the entrance to the nozzle, comprising:
   first pressure responsive means for detecting the total pressure $P_{T5}$ in the diffuser and providing a first signal representative of said total pressure,
   second pressure responsive means for detecting the static pressure $P_{SN}$ at the nozzle entrance and providing a second signal representative of said static pressure,
   third pressure responsive means positioned between the upstream side of the diffuser and the nozzle entrance and upstream of said second pressure responsive means, for detecting the static pressure $P_{S6}$ and providing a third signal representative of said static pressure, and computer means for combining said first, second and third signals to determine iteratively the nozzle total pressure $P_{TN}$ according to the relationship $$P_{TN} = \eta(P_{TN}, P_{T5}, P_{S6}, P_{SN}, C_1, C_2, \gamma, K_1)$$

where
   $C_1$ is a dimensionless constant related to tailpipe geometry
   $C_2$ is a dimensionless constant related to the fluid flow characteristics in the tailpipe,
   $\gamma$ is the means ratio of tailpipe gas specific heats, and
   $K_1$ is a dimensionless constant used to obtain a prediction of the flameholder region total pressure,
and to provide a fourth signal representing said nozzle total pressure $P_{TN}$.

2. Apparatus as defined in claim 1 and further including apparatus for utilizing said fourth signal for determining the gross thrust of said engine and providing an output signal representing said gross thrust comprising:
   means receiving said fourth signal representing the total pressure at the nozzle entrance $P_{TN}$ and a fifth signal representing ambient static pressure $P_{so}$ and providing an output signal representing nozzle pressure ratio $\alpha_e = P_{TN}/P_{so}$,
   a first and a second decision circuit means,
   a first and a second logic means,
   said first decision circuit means being responsive to a signal indicating the nozzle is convergent-divergent to select said first logic means and responsive to a signal indicating the nozzle is convergent only to select said second decision circuit means,
   said second decision circuit means being responsive to said signal representing $\alpha_e$ being less than $(\gamma+1/2)^{\gamma/\gamma-1}$, where $\gamma$ is the exhaust gas ratio of specific heats, to select said first logic means and responsive to said signal $\alpha_e$ being equal or greater than $(\gamma+1/2)^{\gamma/\gamma-1}$ to select said second logic means,
   said first logic means providing, when selected, an output representing gross thrust $F_G$ in accordance with the relationship $$F_G = A_N \cdot P_{so} \cdot f_1(P_{TN}, P_{SN}) \cdot f_c(P_{TN}/P_{so})$$

where $A_N$ is the area of the nozzle entrance, $f_c(P_{TN}/P_{so})$ is a function of the nozzle pressure ratio for complete expansion,
   said second logic means providing, when selected, an output signal representing gross thrust $F_G$ in accordance with the relationship $$F_G = A_N \cdot P_{so} \cdot f_1(P_{TN}, P_{SN}) \cdot f_I(P_{TN}/P_{so})$$

where $f_I(P_{TN}/P_{so})$ is a function of the nozzle pressure ratio for incomplete expansion.

3. A gross thrust meter for a jet type engine which includes a diffuser and a nozzle, said thrustmeter comprising:
   first pressure responsive means for detecting the total pressure $P_{T5}$ in the diffuser and providing a first signal representative of said total pressure,
   second pressure responsive means for detecting the static pressure $P_{SN}$ at the nozzle entrance and providing a second signal representative of said static pressure,
   third pressure responsive means positioned between the upstream side of the diffuser and the nozzle entrance and upstream of said second pressure responsive means, for detecting the static pressure $P_{S6}$ and providing a third signal representative of said static pressure, fourth pressure responsive means for detecting ambient static pressure $P_{so}$ and providing a fourth signal representative of said static pressure, first computer means for combining at least said first, second and third signals to determine iteratively a value for nozzle total pressure $P_{TN}$ and providing a fifth signal representing $P_{TN}$ according to the relationship $$P_{TN} = \eta(P_{TN}, P_{T5}, P_{S6}, P_{SN}, C_1, C_2, \gamma, K_1)$$

where $C_1$ is a dimensionless constant related to tailpipe geometry, $C_2$ is a dimensionless constant related to the fluid flow characteristics in the tailpipe, $\gamma$ is the mean ratio of tailpipe gas specific heats, and $K_1$ is a dimensionless constant used to obtain a prediction of the flameholder region total pressure, and second computer means combining said second, fourth, fifth and other predetermined signals and deriving an output signal therefrom representing gross thrust.

* * * * *